(12) United States Patent
Wood et al.

(10) Patent No.: US 7,739,695 B2
(45) Date of Patent: Jun. 15, 2010

(54) COMPUTER IMPLEMENTED METHOD AND SYSTEM FOR RUNNING A PLURALITY OF BUSINESS PROCESSES

(75) Inventors: Eric Wood, Menlo Park, CA (US); Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 137 days.

(21) Appl. No.: 11/185,590

(22) Filed: Jul. 19, 2005

(65) Prior Publication Data

US 2006/0036687 A1 Feb. 16, 2006

(30) Foreign Application Priority Data

Jul. 19, 2004 (EP) ................................. 04017029

(51) Int. Cl.
*G06F 9/44* (2006.01)
(52) U.S. Cl. ........................ 719/328; 719/311; 719/318; 709/246
(58) Field of Classification Search ................. 719/320, 719/328, 311, 310, 318; 709/200, 201, 217, 709/218, 219, 223, 224, 225, 246
See application file for complete search history.

(56) References Cited

U.S. PATENT DOCUMENTS

| | | | | |
|---|---|---|---|---|
| 6,744,877 | B1 * | 6/2004 | Edwards | 379/265.02 |
| 6,763,353 | B2 * | 7/2004 | Li et al. | 719/310 |
| 7,107,285 | B2 * | 9/2006 | von Kaenel et al. | 707/104.1 |
| 7,151,438 | B1 * | 12/2006 | Hall et al. | 340/286.06 |
| 7,289,964 | B1 * | 10/2007 | Bowman-Amuah | 705/1 |
| 2002/0174265 | A1 * | 11/2002 | Schmidt | 709/328 |
| 2002/0194219 | A1 * | 12/2002 | Bradley et al. | 707/506 |
| 2003/0004746 | A1 * | 1/2003 | Kheirolomoom et al. | 705/1 |
| 2003/0084177 | A1 * | 5/2003 | Mulligan | 709/230 |
| 2003/0093500 | A1 * | 5/2003 | Khodabakchian et al. | 709/219 |
| 2003/0135628 | A1 * | 7/2003 | Fletcher et al. | 709/229 |
| 2003/0163513 | A1 * | 8/2003 | Schaeck et al. | 709/201 |
| 2003/0163613 | A1 * | 8/2003 | Stuber et al. | 710/15 |
| 2004/0103195 | A1 * | 5/2004 | Chalasani et al. | 709/226 |
| 2004/0119752 | A1 * | 6/2004 | Beringer et al. | 345/779 |
| 2004/0254945 | A1 * | 12/2004 | Schmidt et al. | 707/100 |

(Continued)

OTHER PUBLICATIONS

Dan Woods; "Packaged Composite Applications: A Liberating Force For the User Interface" Oct. 2003, XP002349437 www.sapdesignguild.org/editions/edition7/print_composite_applications.asp.

(Continued)

*Primary Examiner*—Van H Nguyen
(74) *Attorney, Agent, or Firm*—Blakely, Sokoloff, Taylor & Zafman, LLP (57) ABSTRACT

A computer implemented method for running a plurality of business services within an explicitly defined business context wherein the context and the business services are representing meaningful instances of work situation or actions, the method comprising: provisioning web services, a composition of services, or both with an additional input/output interface for passing data from and to a parent business context; enabling this interface to handle long running, stateful actions; and implementing a standardized user interaction behavior to make the user interface of an action reusable across contexts. An embodiment of the invention introduces an "action" concept which can be technically described as a wrapping layer on top of enterprise services that provides a special plug & execute interface to enable a service or a composition of services to interact with a parent context.

6 Claims, 7 Drawing Sheets

U.S. PATENT DOCUMENTS

| | | | |
|---|---|---|---|
| 2005/0021355 A1* | 1/2005 | Brendle et al. | 705/1 |
| 2005/0021536 A1* | 1/2005 | Fiedler et al. | 707/100 |
| 2005/0021998 A1* | 1/2005 | Fiedler et al. | 713/200 |
| 2005/0022157 A1* | 1/2005 | Brendle et al. | 717/104 |
| 2005/0027495 A1* | 2/2005 | Matichuk | 703/2 |
| 2005/0267765 A1* | 12/2005 | Jeng et al. | 705/1 |

OTHER PUBLICATIONS

Norbert Kuck; "Inside SAPGUI for the Java Environment", Jun. 20, 2000, XXP002349438, www.elec.ucl.ac.be/logistique/informatique/SAP/PlatinGUI-TechEd2000.pdf, Oct. 11, 2005.

Song et al; "Slate Management In Web Services", Distributed Computing Systems—Proceedings 2004, 10th IEEE Intl Workshop on Future Trends of Suzhou, China; May 26-28, 2004, Piscataway, NJ, XP010711484, pp. 21-27.

"SAP Enterprise Portal—Portal Content", 2003, XP002349439, www.sap.com/solutions/netweaver/enterpriseportal/pdf/BWP_portal_content.pdf.

"SAP iView guidelines", May 2, 2003, XP002268912, www.sapdesignguild.org/resources/ma)guidelines_3/ma_guidelines_3.pdf.

"MySap Technology—IT Landscapes: Architecture and Life-Cycle Management of Distributed Environments of Distributed Environments" 2002, XP002349440, www.sap.com/solutions/netweaver/pdf/landscape.pdf.

Leff et al, "Web-application Development using the Model/View/Controller Design Pattern" Enterprise Distributed Object Computing Conference 2001, Proceedings, 5th IEEE Int'l. Sep. 2001, Piscataway, NJ, USA. pp. 118-127, XP010557275.

* cited by examiner

COMPUTER IMPLEMENTED METHOD AND SYSTEM FOR RUNNING A PLURALITY OF BUSINESS PROCESSES

CROSS REFERENCE TO RELATED APPLICATIONS

This application claims the benefit of priority from European Application No. EP04017029.2, filed on Jul. 19, 2004.

TECHNICAL FIELD

Embodiments of the invention generally relate to the field of computer operations and, more particularly, to implementing a service oriented business application on a computer system.

BACKGROUND OF THE INVENTION

An embodiment of the invention relates to a method for implementing a service oriented business application on a computer system. Specifically, an embodiment of the invention relates to a computer implemented method and system for running a plurality of business processes, wherein process data are handled in data objects by one or more service oriented business applications run on a computer. An embodiment of the invention further relates to a computer system for running a plurality of business processes, a computer program product and an article of manufacture with a computer usable medium.

Service-oriented business applications running on programmable devices, such as computers, are known. Service-oriented architectured applications have more flexibility to create an optimized user experience by composing all relevant functions and information in one place across different backends. These applications may aid users of the applications performing their activities within an enterprise. For example, a business application may guide a user through steps of a certain business process in a certain order, e.g. hiring a new employee. For different steps in this process the business application may then provide the user with one or more services at the user interface, such as filling in and submitting a form to a database (e.g. with the new employees name address etc), and ordering items.

It is known to implement a service-oriented business application using a plurality of services. Typically, a service is implemented as a set of procedures or functions hosted on a computer server connected to the computer devices.

A computer device on which the business application is running can request data from the computer server, by submitting a set of parameters to the set of procedures or functions on the server.

It is known to implement such services as Web services which allow a user of a web browser to request XML data from the server by submitting parameters to the server. Web services (sometimes called application services) are services (usually including some combination of programming and data, but possibly including human resources as well) that are made available from a business's Web server for Web users or other Web-connected programs. Web services range from major services like storage management and customer relationship management (CRM) down to much more limited services such as the furnishing of a stock quote and the checking of bids for an auction item.

However, implementing the known service-oriented business applications is a complex task, since by definition web services have no user interface and the context in which multiple services are orchestrated has yet to be defined. Accordingly, complex techniques have to be applied to enable a transfer of data from a first to a second service when the implemented business application is running. The complexity increases disproportionally with the amount of services involved.

Modern business applications will follow a service-oriented architecture in which many enterprise services are exposed as small granular entities. New, so called composite applications are composed by configuring and composing new solutions based on such services. A problem, however, is that these enterprise services are still very system-related and do not directly model reasonable business acts that are meaningful for business experts, who lack expert programming experience. In order to let business experts develop, modify, or extend business solutions, a library with meaningful business actions or process steps is needed that can be configured to higher level processes.

Another problem is that the same business service may be used at different screens of the applications, or even in completely different contexts like as a step or as a related action within a workflow. From the engineering point of view it is desirable to have one implementation even for services that come with a user interface and re-use the same component in all situations.

SUMMARY OF THE INVENTION

An embodiment of the invention is a computer implemented method for running a plurality of business services within an explicitly defined business context wherein the context and the business services are representing meaningful instances of work situation or actions, the method comprising: provisioning web services and/or a composition of services with an additional input/output interface for passing data from and to a parent business context; enabling this interface to handle long running, stateful actions; and implementing a standardized user interaction behavior to make the user interface of an action reusable across contexts. An embodiment of the invention introduces an "action" concept which can be technically described as a wrapping layer on top of enterprise services that provides a special plug & execute interface to enable a service or a composition of services to interact with a parent context.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

An embodiment of the invention introduces an "action" concept which can be technically described as a wrapping layer on top of enterprise services that provides a special plug & execute interface to enable a service or a composition of services to interact with a parent context. Besides a well defined input/output interface that is used to populate data from context into the service module, and output variables that can be stored within the parent context, the interface has several additional capabilities to control or inform the parent context about the status of the action, about the type of resources it uses, about possible new roles implied by the actions, and more. The interface can handle long-running actions, a concept that does not exist in the web or enterprise service specification.

Such "actions" represent a unit of work which is perceived as a meaningful act by end users and as such typically will include a user interface to receive input from the user. If no user interaction is required, actions can also be executed automatically using the same interface.

A complex work context consisting itself of several actions and local roles does expose such an action interface as well. As such it can be linked to a parent context using the same action interface because the action interface is designed to manage stateful, long-running actions.

Such actions are seen as an important concept for building composite applications that orchestrate services provided by SOA (service oriented application) platforms into meaningful business solutions. A composite application will mainly model composite business contexts or processes by assembling re-usable actions and mapping input and output parameters across such actions. The user interface of such actions must be conformed to some standards provided by a context navigation framework in order to allow the system to launch any action. The plug & execute interface can also include meta information about user interface requirements (e.g. in-place vs. new window) or if a user interface is needed at all. By introducing a standard behavior with respect to user interface, the user interface of an action becomes re-usable in any other context.

Role-based authorization mechanisms within a context model will also operate on the level of actions and will define what action can be executed by what role.

An embodiment of the invention further exploits the potential of service-oriented platforms by creating a repository of re-usable business actions that can not only be re-used within composite applications and process models, but which can also be offered to business experts for end user configuration scenarios business processes.

Figure 1:
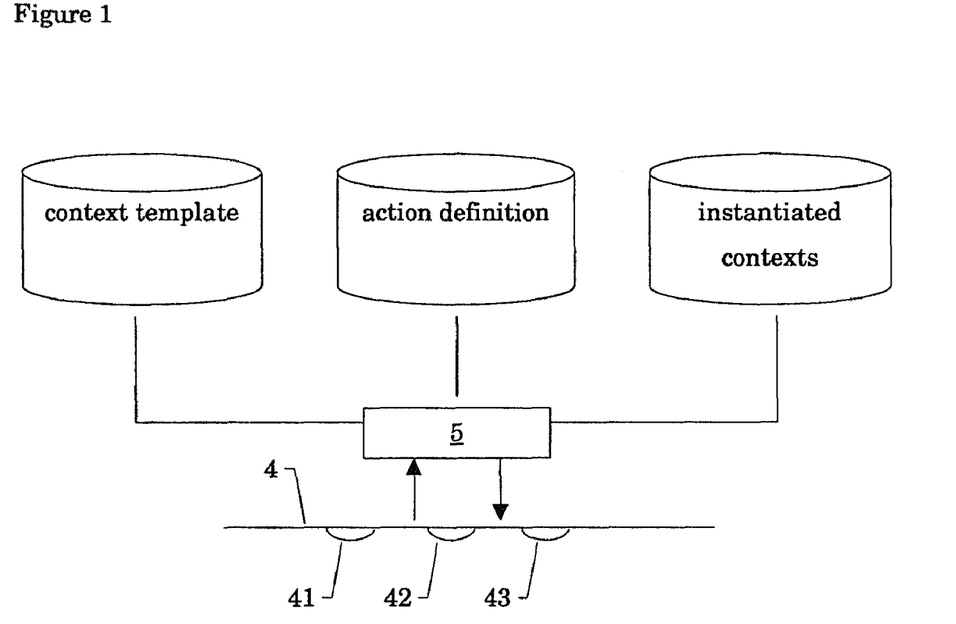
FIG. 1 schematically shows a block diagram of a computer system suitable for implementing a service oriented business application.

In FIG. 1, a computer system 1 is shown. The computer system 1 includes a context template repository 2 and an action repository 3. The computer system further has an interface 4 which is provided with suitable controls 41-43, for implementing a service oriented business application. The interface 4 and the repositories 2, 3 are communicatively connected to a processor 5.

In the context template repository 2, context definitions, also referred to as context templates, are stored. The context definitions provide meta-data about a context, i.e. the structure of the context, possible parameters etc. The context template defines parameters related to a specific work context, such as artifacts used in the work context, actions which can be performed and people involved in the work context or any other suitable parameter. The context definition may further define how the parameters interact or any other suitable aspect.

In the action repository 3, one or more action definitions are stored. The action definition contains at least a definition of the inputs and outputs of the action, i.e. the actions definition defines at least the input/output interface of an action. However, the action definition may also contain other information about an action, such as which other actions can be associated with the action, what the functionality of the action or other suitable information.

Via the interface 4, one or more action definition may be selected. The actions can be used to perform a certain series of steps within the context. The selected action definition is then associated with the instantiated context.

Figure 2:
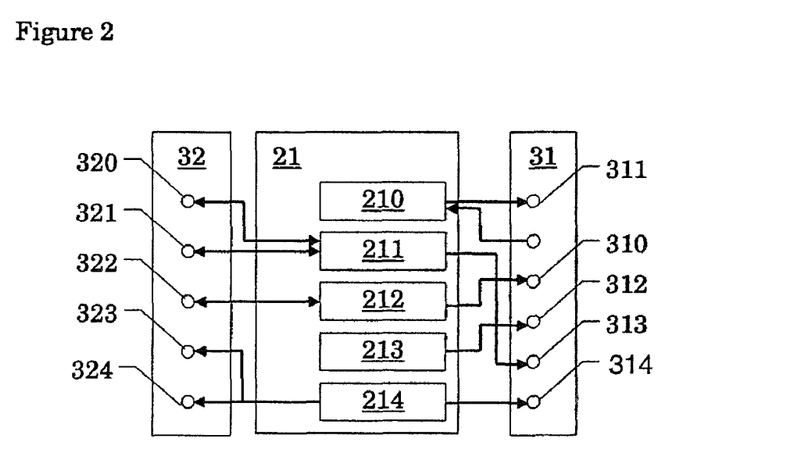
FIG. 2 schematically shows a first example of a context definition linked to actions definitions.

At least one parameter of the instantiated context is mapped with one or more input or output parameters of the associated action definitions. For example, as shown in FIG. 2, an action definition 31 may define that a certain service has inputs 311-315 and has an output 310. The parameters 210-214 of the instantiated context 21 can then be mapped to the inputs 311-315 and the output 310. As shown in the example, parameters 210-214 are each mapped to a different one of inputs 311-315, and the output 310 is mapped to parameter 210. For another action definition 32, the parameters may be mapped differently, as shown in FIG. 2.

Thus, in the example of FIG. 2, when the service-oriented business application is running, the action corresponding to definition 31 will receive input data from parameters 210-214 via inputs 311-315, and output data to the context 21 via output 310. This output data will be received by parameter 210. The output of the service corresponding to the action definition 32 is thus provided to the context 21, which is modified thereby. The other action definition 32 can then use the modified context 21 to obtain input and/or output data. In this example, the context 21 thus operates as a data exchange fabric for two or more actions. Accordingly, the necessity to match the input/output interfaces of the different services to each other is obviated and data can be transferred in a simple manner from one service to another service.

Figure 3:
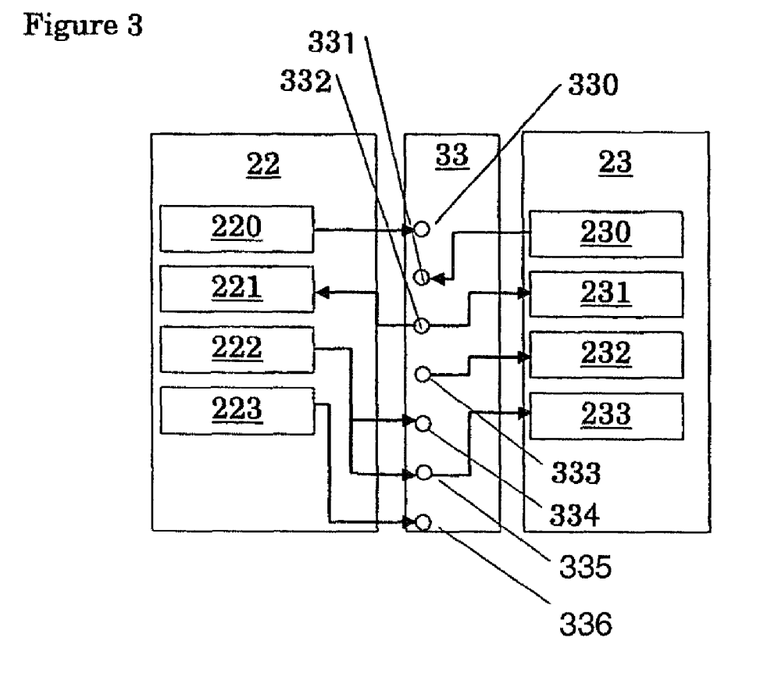
FIG. 3 schematically shows a second example of a context definition linked to actions definitions.

In the example of FIG. 3, input and outputs 330-336 of the action definition 33 are mapped to parameters 220-223 respectively to parameters 230-233 of two different contexts 22, 23.

Figure 4:
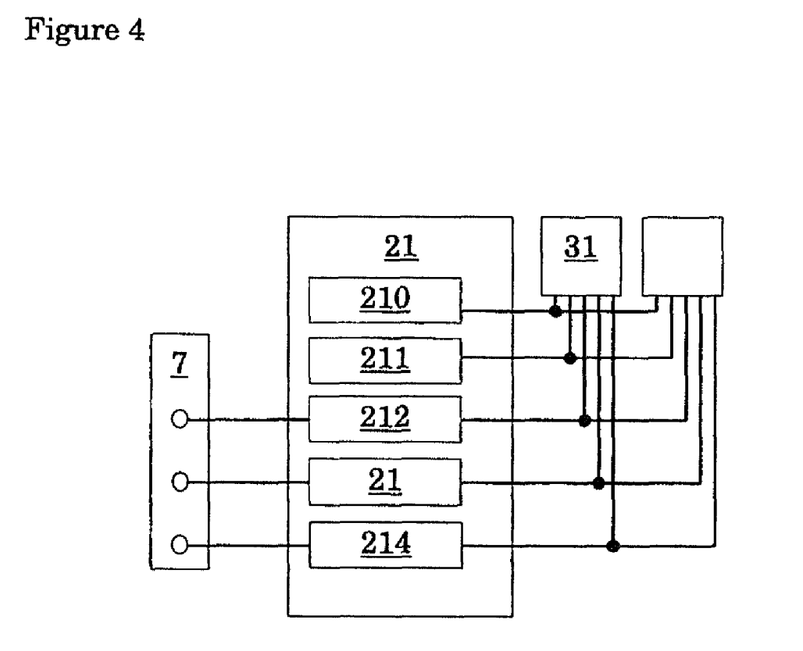
FIG. 4 schematically shows a third example of a context definition linked to actions definitions and to a user interface definition.

As schematically shown in FIG. 4, one or more parameters of the instantiated context 21 can be coupled to a user-interface definition 7. In FIG. 4, the context 21 and the actions definitions 31, 32 shown in FIG. 2 are shown, and the parameters 212-214 are coupled to respective inputs 71-73 of a user-interface (UI) definition. The user-interface definition defines a UI corresponding to the definition. The UI definition may for example define a template for a graphical user interface (GUI), such as which windows will be present in the GUI, what type of information has to be displayed in the windows etc. Thus, the parameters 212-214 coupled to the inputs 71-73 of the UI definition are outputted in the UI when the service-oriented business application is running.

Figure 5:
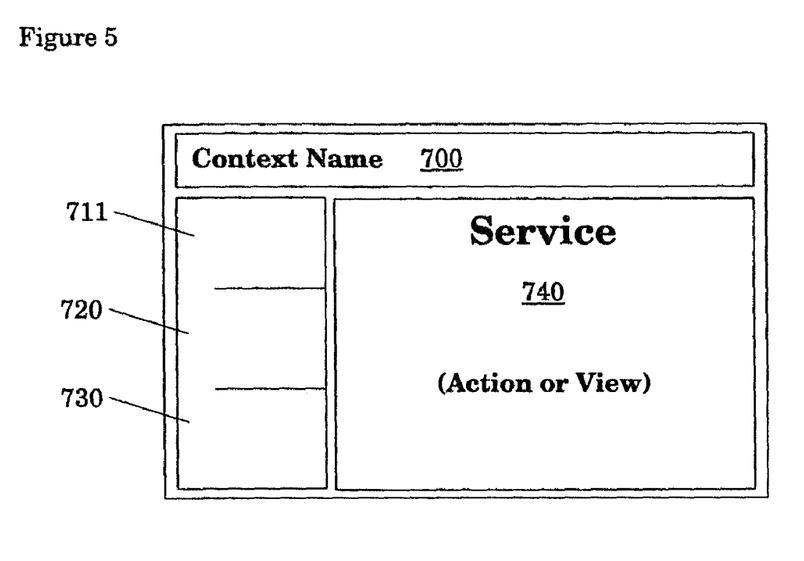
FIG. 5 schematically shows a block diagram of a Graphical User Interface suitable for the example of FIG. 4.

FIG. 5 schematically shows a GUI suitable to be used in the example of FIG. 5. The GUI has a context information window 700 in which information about the current context is displayed. In this example in the context information window 700 the name of the current context is visually outputted. However, the context information window 700 may likewise contain other suitable information about the current context.

The GUI 70 further has a control window provided with controls 710,711,720 and 730. An action control 710 allows a user of the system to view actions linked to the current context. For example, the action control 710 can provide the user with a sequence of actions used to perform successive steps in a business process related to the current context. Via a view control 711, a user can select a view of the current context. For example, by selecting the view control, a list of participant in the current context is outputted in the service window 740, also referred to as a service container 740, or any other suitable parameter of the current context. An object/method control 720 allows a user to control or select objects or methods of the current context. A recent context control 730 visually outputs which contexts have been used recently, and allows a user to select one of the recently used contexts.

Figure 6:
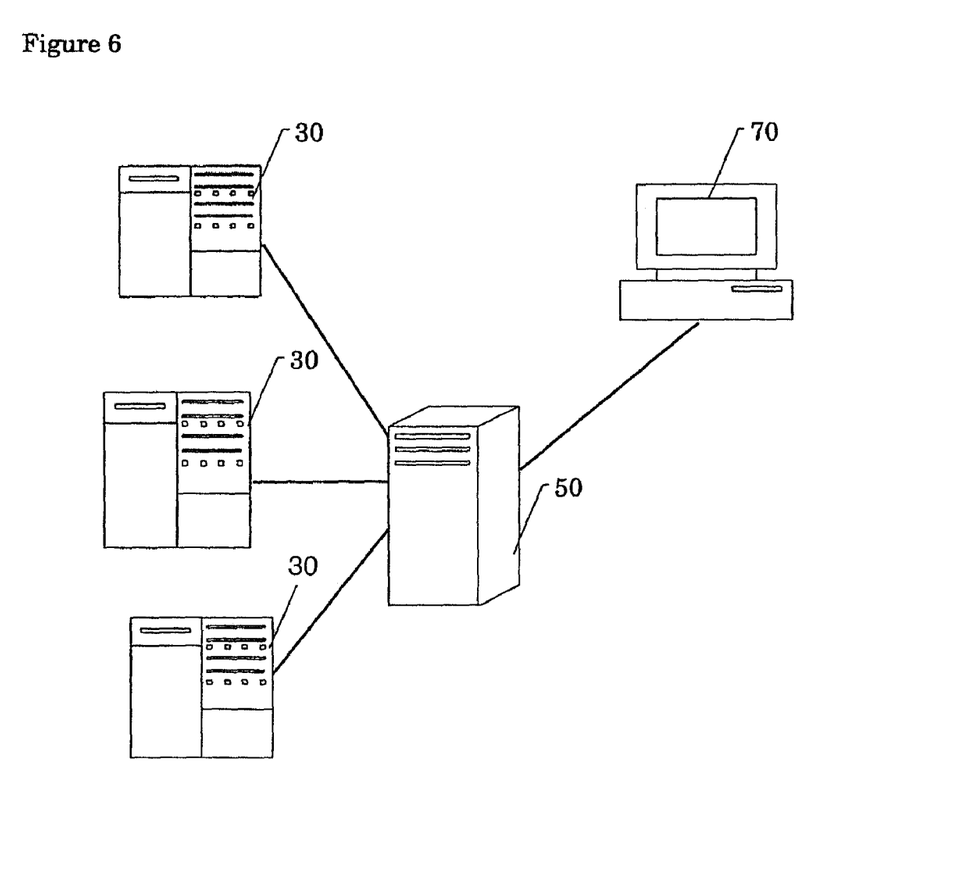
FIG. 6 schematically shows a block diagram of a computer network provided with a service oriented business application according to the invention.

FIG. 6 schematically shows a computer network suitable for running the service-oriented business application shown in FIG. 5. The computer network includes a number, in this example three, server systems 30. Each of these server systems 30 provides an action, and is communicatively connected to a context server 50. On the server systems 30 a set of procedures or functions are hosted. The context server 50 can request data from the computer server, by submitting a set of parameters to the set of procedures or functions on the server. On the server 50 two or more contexts are present, and the server 50 is arranged to submit parameters of the contexts to the actions provided by the server systems 30 or to receive data from the server systems and adjust the context in correspondence with the received data. The context server 50 is further connected to a computer system provided with a GUI 70 on which aspects of the context and or the actions can be outputted visually, as explained with reference to FIG. 5.

The context definitions include at least one of: types of participants, status data and actions associated with the business state. The context template may for example include one or more of the following: slots, inferred variables, actions, rules and contextual floor plans, as will be explained below in more detail. Slots are variables that are initialized upon instantiation of the context out of the business context.

Figure 7:
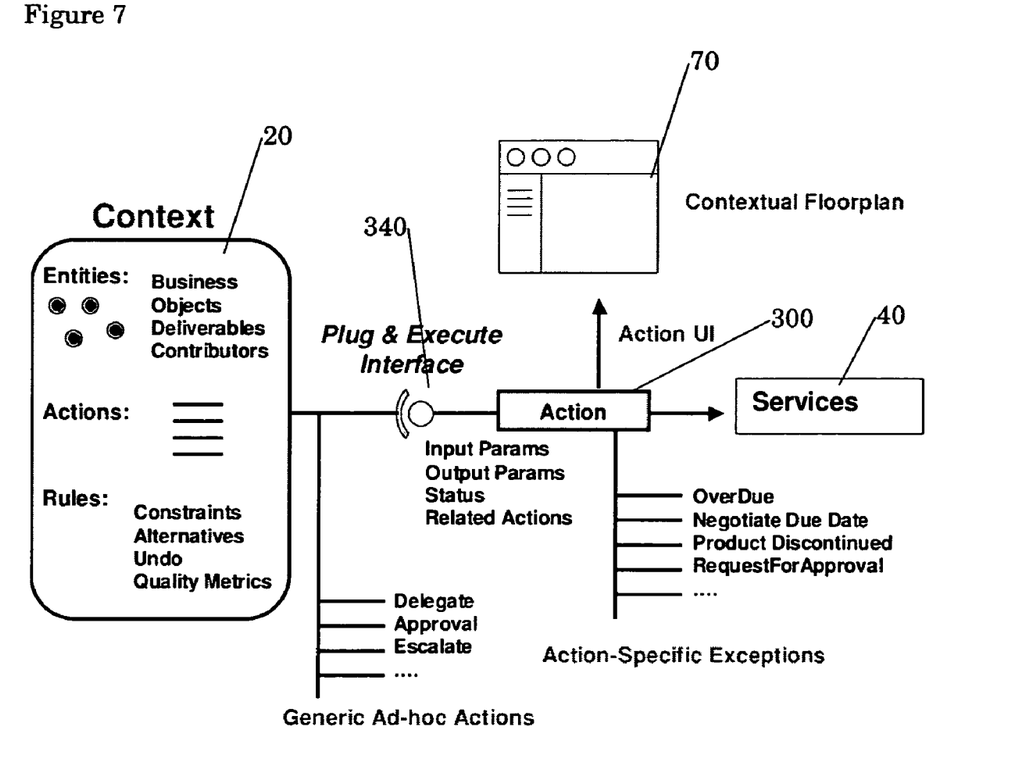
FIG. 7 shows a schematic drawing illustrating the inventive concept of the action.

Turning to FIG. 7 there is shown a schematic drawing of an action and its connection to a specific work context. An action 300 is instantiated providing an interface 340 to a work context 20. The action 300 activates one or more generic services, preferably web services, wherein a predefined number of data objects are handled in the work context 20. In this respect it can be said that an action may be viewed as a context aware service: it functions as a wrapping layer that executes the service while providing the service of the appropriate context data. As can be seen in the drawing the action 300 is preferably designed to have a plug & execute interface 340 which may be described as a generic data-interface through which data exchange and process control is possible from the context to the action. In this way actions can be re-used as task building blocks in any context In particular, actions are atomic tasks or particular instances of work that a user performs in a given work context 20 or steps that users must execute in a process. Depending on the complexity of the Action a user interface 340 is provided different wherein Action patterns are provided by the contextual user interface framework. In this way, a user centric interface is provided where for a user, actions are perceived as a single task from within the current context. The detailed design of the user interface 70 is determined by the task that is executed.

Several Action types can be distinguished:

Simple Actions. Such Actions are supported by one single screen that can be launched within a context next to the Contextual Panel.

Guided Actions. Such Actions require a multiple screens sequence that models the task or interaction flow needed to perform this Action. A wizard with a roadmap component guides the user through all steps.

The action may also expose related actions to the user interface of the parent context 70 which then is providing such options within the contextual action bar at the side of the action.

Figure 8:
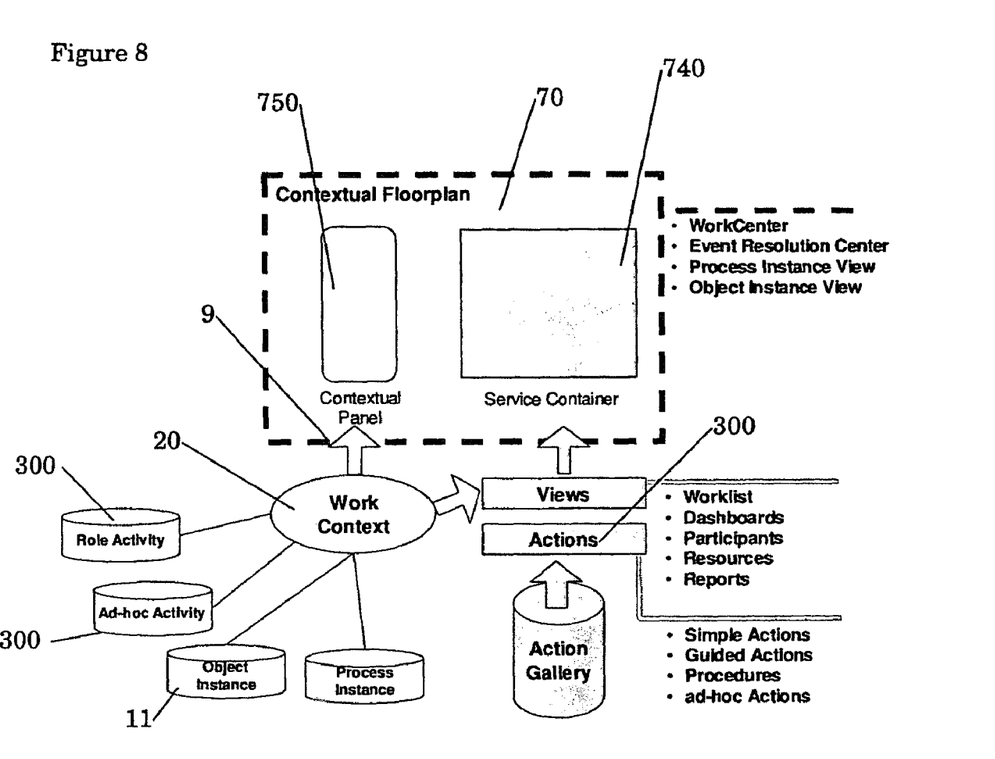
FIG. 8 shows a further schematic drawing illustrating an action gallery and its respective user interfaces in a work context.

FIG. 8 shows a specific layout for a user interface 70 that provides an action interface as previously described. This layout is called "Contextual Floorplans". All screens that cover more than a single action are designed as a place to do work.—include many different functions and views all supporting one coherent activity. The general page layout for such places is called Contextual Floorplan and consists of a left hand Contextual Panel for navigation, and a right hand container for launching services in-place. Those in-place actions enable the user to perform actions without leaving the current work context 20. Depending on the user focus the context may represent a role-specific activity or a specific work instance like a workflow or business object. In the contextual floorplan 70 a "contextual panel" 1 is present and a "service container" 740. The contextual panel 750 has been designed to provide the most important functionality and navigation within the current working context. The Contextual Panel 750 typically offers a list of views or facets on the current work context 20 and a list of related actions. Both are technically implemented as Actions but views are by default not transactional.

Figure 9:
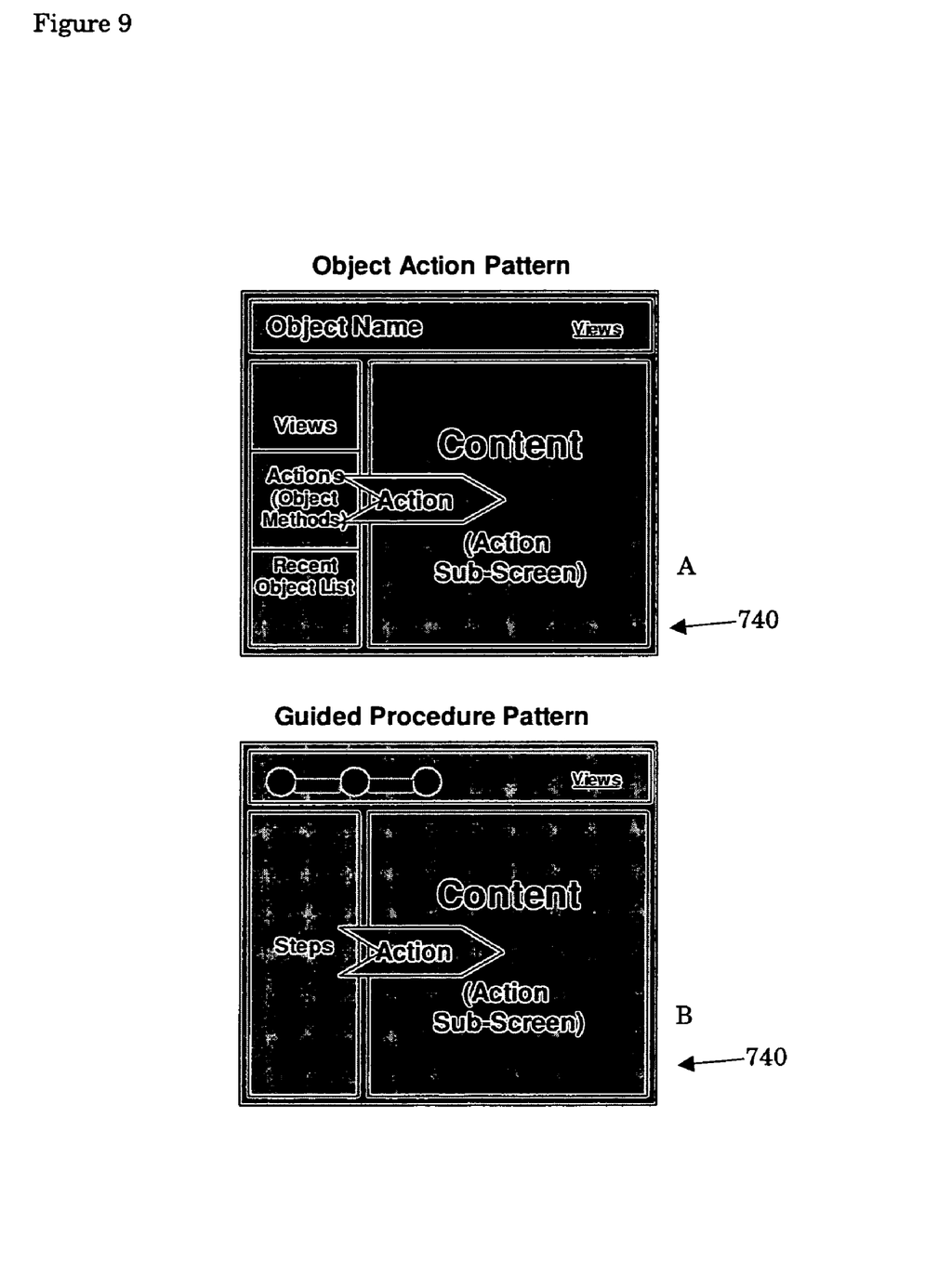
FIG. 9 shows an implementation of an action specific user interface.

FIG. 9 shows an example of using virtually the same user interfaces for two different contexts. One context is more object oriented 9A, and one is more process driven 9B. FIG. 9A shows an Object centric view, wherein a Service container 740 is presented to provide specific actions on business objects provided by the work context. FIG. 9B shows a process centric view, where an action is presented to perform a specific step in a typical guided procedure. In both cases the user interaction is identical, actions are launched from the Contextual Panel and are displayed in the service container. Based on this standardization of user interaction and the common plug&play technical interface between Actions and interface, the Actions become re-usable in different contexts or application screens.

Figure 10:
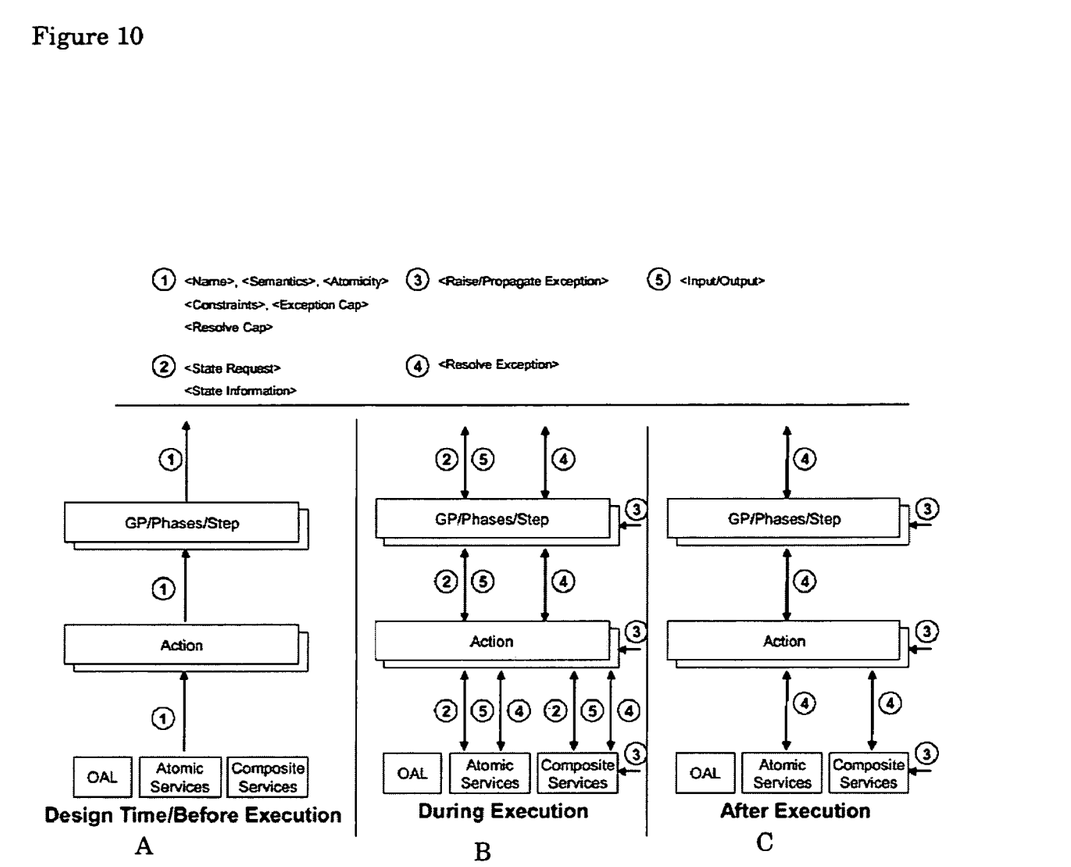
FIG. 10 shows different execution states of an action and parameter transfer in these stages.

FIG. 10 shows additional elements indicative of the concept of an Action. Here, in the A, B, and C figures, different execution states are shown and the parameter flow (indicated by arrows (1)-(5)) during these states. Specifically FIG. 10A shows a parameter flow before execution; FIG. 10B shows a parameter flow during execution and FIG. 10C shows a parameter flow after execution.

These figures are indicative also to show a difference between a conventional web-services layer 13 and the inventive action layer 14 that wraps this service layer. Indeed, the action layer 14 provides a context specific interface 15 which is provided as a Guided Procedure (GP) interface. Before execution, the interface only presents itself by identifying the <name>, <semantics><atomicity> <constraints><exception cap> and <resolve cap> features. During execution, the input/output of parameters between atomic services is arranged via the action layer, indicated by the (5) arrows. Where needed, the context is accessed via the guided procedure interface 15. Exceptions may be raised (3) and propagated (4) on and to each level for exception resolution. After execution of a specific action, exceptions and exception resolution is still possible for long running processes such as sub-processes, flow control or status tracking.

It should be noted that the above-mentioned embodiments illustrate rather than limit the invention, and that those skilled in the art will be able to design alternatives without departing from the scope of the appended claims. For example, the computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output. The mere fact that certain measures are recited in mutually different claims does not indicate that a combination of these measures cannot be used to advantage.

The invention claimed is:

1. A computer implemented method comprising:
   instantiating an action to run a plurality of business services within an explicitly defined business context, wherein running the business services within the business context generates meaningful instances of work situations by altering data and processes within an enterprise system, the instantiating including:
   mapping as the business services one or more web services, composition of services, or a combination thereof to input/output parameters of the business context, the mapping performed with an input/output interface of the instantiated action that provides a wrapper layer for the business services to exchange data between the business context and the business services;
   enabling the input/output interface to handle long running, stateful actions, wherein for the instantiated action a predetermined number of action states is defined, which comprise a before execution action state, a during execution action state, an after execution action state and an undo execution action state, and
   implementing a user interaction behavior defined to be common to the long running, stateful actions executing under a business application to make a user interface of the long running, stateful actions executing under the business application reusable across a plurality of business contexts;
   wherein an exception handler is defined that couples the instantiated action to a further action for handling exceptions.

2. The method according to claim 1, wherein the instantiated action is designed with a predetermined interface to be used in a plurality of work contexts.

3. The method according to claim 1, wherein the instantiated action is designed as part of a series of corresponding activities; or wherein the instantiated action is designed as an ad hoc activity.

4. An article of manufacture comprising a computer readable storage medium having computer readable instructions stored thereon for providing access to resources available on a computer, the computer readable instructions, when executed, causing the computer to:
   instantiate an action to run a plurality of business services within an explicitly defined business context, wherein running the business services within the business context generates instances of work situations by altering data and processes within an enterprise system, the instantiating including:
   mapping as the business services one or more web services, composition of services, or a combination thereof to input/output parameters of the business context, the mapping performed with an input/output interface of the instantiated action that provides a wrapper layer for the business services to exchange data between the business context and the business services,
   enabling the input/output interface to handle long running, stateful actions, wherein for the instantiated action a predetermined number of action states is defined, which comprise a before execution action state, a during execution action state, an after execution action state and an undo execution action state, and
   implementing a user interaction behavior defined to be common to the long running, stateful actions executing under a business application to make a user interface of the long running, stateful action executing under the business application reusable across a plurality of business contexts,
   wherein an exception handler is defined that couples the instantiated action to a further action for handling exceptions.

5. The article of manufacture according to claim 4, wherein the instantiated action is designed with a predetermined interface to be used in a plurality of work contexts.

6. The article of manufacture according to claim 4, wherein the instantiated action is designed as part of a series of corresponding activities; or wherein the instantiated action is designed as an ad hoc activity.

* * * * *